(12) United States Patent
Hirunuma et al.

(10) Patent No.: US 6,937,391 B2
(45) Date of Patent: Aug. 30, 2005

(54) OPTICAL VIEWER INSTRUMENT WITH PHOTOGRAPHING FUNCTION

(75) Inventors: Ken Hirunuma, Tokyo (JP); Atsumi Kaneko, Tokyo (JP); Shuji Yoneyama, Saitama (JP); Moriyasu Kanai, Saitama (JP); Gouji Funatsu, Saitama (JP)

(73) Assignee: PENTAX Corporation, Tokyo (JP)

( * ) Notice: Subject to any disclaimer, the term of this patent is extended or adjusted under 35 U.S.C. 154(b) by 189 days.

(21) Appl. No.: 10/255,609

(22) Filed: Sep. 27, 2002

(65) Prior Publication Data

US 2003/0063382 A1 Apr. 3, 2003

(30) Foreign Application Priority Data

Sep. 28, 2001 (JP) ..................................... P2001-301921
Sep. 28, 2001 (JP) ..................................... P2001-301960
Jan. 23, 2002 (JP) ..................................... P2002-014051

(51) Int. Cl.$^7$ ............................................. G02B 23/00
(52) U.S. Cl. ........................ 359/425; 359/407; 359/418
(58) Field of Search ................................ 359/425, 429, 359/399, 407, 410, 411, 412, 418

(56) References Cited

U.S. PATENT DOCUMENTS

| | | | | |
|---|---|---|---|---|
| 4,067,027 A | | 1/1978 | Yamazaki ..................... | 396/432 |
| 4,262,988 A | | 4/1981 | Ishibai et al. ............... | 359/418 |
| 4,400,065 A | | 8/1983 | Nagler ....................... | 359/788 |
| 5,235,458 A | | 8/1993 | Akagi et al. ................ | 359/410 |
| 5,581,399 A | * | 12/1996 | Abe ........................... | 359/410 |
| 5,583,692 A | | 12/1996 | Funatsu ...................... | 359/422 |
| 5,686,960 A | * | 11/1997 | Sussman et al. ......... | 348/218.1 |
| 5,729,390 A | | 3/1998 | Abe ............................ | 359/661 |
| 5,742,341 A | | 4/1998 | Ohishi et al. ............... | 348/373 |
| 5,963,369 A | | 4/1998 | Steinthal et al. ............ | 359/410 |
| 5,926,657 A | | 7/1999 | Hasushita .................... | 396/148 |
| 5,930,035 A | * | 7/1999 | Funatsu ....................... | 359/417 |
| 6,088,053 A | | 7/2000 | Hammack et al. ............ | 348/61 |

(Continued)

FOREIGN PATENT DOCUMENTS

| | | |
|---|---|---|
| JP | 57-79909 | 5/1982 |
| JP | 62-96919 | 5/1987 |
| JP | 3-235491 | 10/1991 |
| JP | 3-242610 | 10/1991 |

(Continued)

OTHER PUBLICATIONS

English Language Abstract of JP 11-248996.
English Language Abstract of JP 2001-311868.
English Language Abstract of JP 2000-147372.
English Language Abstract of JP 11-112851.
English Language Abstract of JP 11-064743.
English Language Abstract of JP 3-235491.
English Language Abstract of JP 11-218692.
English Language Abstract of JP 10-268399.
English Language Abstract of JP 11-160775.
English Language Abstract of JP 3-242610.

*Primary Examiner*—Thong Nguyen
*Assistant Examiner*—Arnel C. Lavarias
(74) *Attorney, Agent, or Firm*—Greenblum & Bernstein, P.L.C.

(57) ABSTRACT

In an optical viewer instrument with a photographing function, there is provided a telescopic lens system for observing objects, and a digital camera system including a solid-state image sensor and a photographing lens system associated with each other such that an object is formed as a photographed image on the solid-state image sensor through the photographing lens system. A manually-operable focussing mechanism is associated with the telescopic lens system and the photographing lens system such that the object is brought into focus through the telescopic lens system, and such that the object is brought into focus through the photographing lens system. Optical parameters are selected such that predetermined conditions are fulfilled, whereby the focussing of the telescopic lens system and the focusing of the photographing lens system can be suitably and properly performed by the focussing mechanism.

17 Claims, 8 Drawing Sheets

U.S. PATENT DOCUMENTS

| | | | |
|---|---|---|---|
| 6,115,552 A * | 9/2000 | Kaneda | 396/82 |
| 6,255,650 B1 | 7/2001 | Warner et al. | 250/330 |
| 2001/0028498 A1 | 10/2001 | Haga et al. | 359/407 |
| 2001/0043395 A1 | 11/2001 | Costales | 359/464 |
| 2002/0109785 A1 | 8/2002 | Hammack et al. | 348/376 |
| 2003/0063189 A1 * | 4/2003 | Hirunuma et al. | 348/79 |
| 2003/0063209 A1 * | 4/2003 | Enomoto et al. | 348/335 |
| 2003/0063383 A1 | 4/2003 | Costales | 359/464 |
| 2003/0227543 A1 | 12/2003 | Hammack et al. | 348/63 |

FOREIGN PATENT DOCUMENTS

| | | |
|---|---|---|
| JP | 5-2132 | 1/1993 |
| JP | 6-2330 | 1/1994 |
| JP | 7-8848 | 2/1995 |
| JP | 7-283978 | 10/1995 |
| JP | 2624556 | 4/1997 |
| JP | 10-268399 | 10/1998 |
| JP | 11-064743 | 3/1999 |
| JP | 11-112851 | 4/1999 |
| JP | 11-160775 | 6/1999 |
| JP | 11-218692 | 8/1999 |
| JP | 11-248996 | 9/1999 |
| JP | 2000-147372 | 5/2000 |
| JP | 2001-281555 | 10/2001 |
| JP | 2001-311868 | 11/2001 |
| WO | 99/06870 | 2/1999 |
| WO | 01/38918 | 5/2001 |
| WO | 01/52531 | 7/2001 |

* cited by examiner

OPTICAL VIEWER INSTRUMENT WITH PHOTOGRAPHING FUNCTION

BACKGROUND OF THE INVENTION

1. Field of the Invention

The invention relates to an optical viewer instrument with a photographing function.

2. Description of the Related Art

As is well known, an optical viewer instrument, such as a binocular telescope, a single telescope or the like, is used for watching sports, wild birds, and so on. When using such an optical viewer instrument, it is often the case that the user sees something that he or she would like to photograph. Typically, he or she will fail to photograph the desired scene because he or she must exchange a camera for the optical viewer instrument and during this time the chance is lost. For this reason, an optical viewer instrument containing a camera is proposed, whereby a photograph can be taken immediately by using the camera contained in the optical viewer instrument while continuing the observation through the optical viewer instrument.

For example, Japanese Laid-Open Utility Model Publication (KOKAI) No. 6-2330 discloses a combination of a binocular telescope and a camera, in which the camera is simply mounted on the binocular telescope. Of course, the binocular telescope includes a pair of telescopic lens systems, and the camera includes a photographing lens system. While an object is observed through the pair of telescopic lens systems, the observed object can be photographed by the camera.

In general, a telescopic lens system includes an objective lens system and an ocular lens system which are associated with each other, and an object at infinity is brought into focus when a rear focal point of the objective lens system and a front focal point of the ocular lens system substantially coincide with each other. Thus, to bring a near object into focus, it is necessary to relatively move the objective lens system and the ocular lens system away from each other. Namely, a focussing mechanism must be incorporated into the telescopic lens system before the near object can be brought into focus.

For example, in a binocular telescope, the focussing mechanism is formed as a movement-conversion mechanism, having a rotary wheel, which converts a rotational movement of the rotary wheel into a relative translational movement between the objective lens system and the ocular lens system included in each telescopic lens system. Namely, in the binocular telescope, a near object is brought into focus by manually rotating the rotary wheel.

In the binocular telescope with the camera, disclosed in the aforesaid Publication (KOKAI) No. 6-2330, both the telescopic lens systems serve as an optical view finder system for the camera, and thus an object, observed through both the telescopic lens systems, is photographed by the contained camera. Nevertheless, the aforesaid Publication (KOKAI) No. 6-2330 makes no reference to focussing the contained camera.

U.S. Pat. No. 4,067,027 discloses another type of binocular telescope containing a camera using a silver halide film. In this binocular telescope with a camera, a first focusing mechanism is incorporated in a pair of telescopic lens systems to bring an object into focus, and a second focusing mechanism is incorporated in a photographing lens system of the contained camera to bring the object into focus. The first and second focusing mechanisms have a common rotary wheel, and are operationally connected to each other so as to be operated together by manually rotating the common rotary wheel. Namely, when the object, observed through the telescopic lens systems, is brought into focus by the operation of the first focussing mechanism, the observed object is focussed on a frame surface of the silver halide film through the photographing lens system by the operation of the second focussing mechanism.

In general, in the field of cameras using a silver halide film, a focussing mechanism for a photographing lens system must be designed such that the degree of unsharpness of an optical image, which is obtained through the photographing lens system, falls within a permissible circle of confusion, before the optical image can be properly brought into focus through the photographing lens system. As is well known, the permissible circle of confusion is mainly determined by the characteristics of the photosensitive material used in the silver halide film. For example, in a 35 mm silver halide film, it is said that a diameter $\delta$ of the permissible circle of confusion is approximately 30 $\mu$m or approximately $\frac{1}{1000}$ of a diagonal line length of a film frame, taking resolution ability of typical person into consideration.

Also, a focal depth of the photographing lens system is defined based on the diameter $\delta$ of the permissible circle of confusion, as follows:

$$\text{FOCAL DEPTH} = 2 \times \delta \times F$$

Herein: "F" represents an f-number of the photographing lens system.

Thus, an object to be photographed must be focussed within a range of the focal depth as defined above, before the photographed object can be obtained as a properly-focussed image. The focal depth of the photographing lens system is variable in accordance with the above-mentioned parameters ($\delta$, F) and the photosensitivity of the silver halide film. When the range of the focal depth is too narrow, it is very difficult to bring the object into the too-narrow-range of the focal depth by the manual operation of the focussing mechanisms.

U.S. Pat. No. 4,067,027 discloses the manually-operated focussing mechanisms, but it refers to no specifications of the telescopic lens systems and the photographing lens system which are suitable for the manual-operation of the first and second focussing mechanisms. Thus, it is impossible to ascertain if the focussing of both the telescopic lens systems and the photographing lens system can be achieved by manually operating the first and second focussing mechanisms.

On the other hand, when a digital camera, using a solid-state image sensor, such as a CCD (Charge-Coupled Device) image sensor, is incorporated in an optical viewer instrument, such as a binocular telescope, a single telescope or the like, and when both a telescopic lens system and a photographing lens system are manually focussed, in addition to the above-discussed matters, other specific issues, involving the solid-state image sensor, must be taken into consideration in the optical design of both the telescopic lens system and the photographing lens system, before satisfactory manual focussing of both the telescopic lens system and the photographing lens system can be ensured.

In short, conventionally, it has not been proposed how an optical viewer instrument with a photographing function should be designed so that a focussing of the photographing lens system can be suitably and properly performed with a desired focussing accuracy, in a manual focussing manner.

In addition, the binocular telescope with the camera, as disclosed in the aforesaid Publication (KOKAI) No. 6-2330 is bulky, because the camera is simply added to the binocular telescope. Also, in U.S. Pat. No. 4,067,027, the camera used is bulky because of the camera box for housing a silver halide film cartridge.

SUMMARY OF THE INVENTION

Therefore, an object of the invention is to provide an optical viewer instrument containing a digital camera system, comprising a telescopic lens system and a photographing lens system, in which both the focussing of the telescopic lens system and the focusing of the photographing lens system can be suitably and properly performed by a manually-operated focussing mechanism.

Another object of the invention is to provided a binocular telescope with a digital camera, which is compactly arranged.

In accordance with a first aspect of the invention, there is provided an optical viewer instrument with a photographing function, comprising a telescopic optical system for observing an object; a digital camera system including a solid-state image sensor and a photographing optical system associated with each other such that the object is formed as a photographic image on a light-receiving surface of the solid-state image sensor through the photographing optical system; and a manually-operable focussing mechanism associated with the telescopic optical system and the photographing optical system such that the object is brought into focus through the telescopic optical system, and such that the object is brought into focus through the photographing optical system. The optical viewer instrument with the photographing function is characterized by the fact that the following conditions are satisfied:

$$65 < y^2/[1000 \times PF(\omega/T)^2] < 95 \text{ and } F < 6$$

Herein: "F" represents an f-number of the photographing optical system;
  "y" represents a maximum image height (mm) of the solid-state image sensor, which is defined as one-half of a diagonal line length of the light-receiving surface of the solid-state image sensor;
  "ω" represents a half field angle (rad) of the telescopic optical system;
  "T" represents a field ratio of the half field angle "ω" to a half field angle "θ" (rad) of the photographing optical system (T=ω/θ); and
  "P" represents a pixel pitch of the solid-state image sensor.

In accordance with a second aspect of the invention, there is provided an optical viewer instrument with a photographing function, comprising a telescopic optical system including an optical objective system; an optical erecting system, and an optical ocular system to thereby observe an object, both the optical erecting and ocular systems being relatively movable with respect to the optical objective system along an optical axis of the telescopic optical system; a tubular shaft rotatably provided beside the telescopic optical system; a photographing optical system housed in the tubular shaft; a solid-state image sensor aligned with the photographing optical system so as to be spaced a given distance away from a rear end of the photographing optical system; a first focussing mechanism that converts a rotational movement of the tubular shaft into a relative translational movement between both the optical erecting and ocular systems and the optical objective system to thereby bring the object into focus through the telescopic optical system; a second focussing mechanism that converts the rotational movement of the tubular shaft into a translational movement of the photographing optical system with respect to the solid-state image sensor to thereby focus the object on a light-receiving surface of the solid-state image sensor; and a manually-operable system that rotationally moves the tubular shaft such that the first and second focussing mechanisms are operationally connected to each other. The optical viewer instrument with the photographing function is characterized by the fact that the aforesaid conditions are satisfied.

Regarding the second aspect of the invention, the second focussing mechanism may be constituted such that a linear relationship is established between the rotational movement of the tubular shaft and the translational movement of the photographing optical system. In this case, the first focussing mechanism may also be constituted such that a linear relationship is established between the rotational movement of the tubular shaft and the relative translational movement between both the optical erecting and ocular systems and the optical objective system.

Alternatively, the second focussing mechanism may be constituted such that a nonlinear relationship is established between the rotational movement of the tubular shaft and the translational movement of the photographing optical system. In this case, the first focussing mechanism may also be constituted such that a nonlinear relationship is established between the rotational movement of the tubular shaft and the relative translational movement between both the optical erecting and ocular systems and the optical objective system.

Further, regarding the second aspect of the invention, there may be a first telescopic optical system and a second telescopic optical system as a substitute for the aforesaid telescopic optical system. In this case, each of the first and second telescopic optical systems includes an optical objective system, an optical erecting system, and an optical ocular system to thereby observe an object, and both the optical erecting and ocular systems are relatively movable with respect to the optical objective system along an optical axis of the second telescopic optical system. The tubular shaft is disposed between the first and second telescopic optical systems, and the first focussing mechanism further converts the rotational movement of the tubular shaft into a relative translational movement between both the optical erecting and ocular systems, included in each telescopic optical system, and the optical objective system, included in each telescopic optical system, to thereby bring the object into focus through the first and second telescopic optical systems.

Optionally, the first and second telescopic optical systems are housed in in a casing, and the casing may include two casing sections movably engaged with each other. The respective first and second telescopic optical systems may be assembled in the casing sections such that the distance between the optical axes of the first and second telescopic optical systems is adjustable by relatively moving one of the casing sections with respect to the remaining casing section. Preferably, one of the casing sections is slidably engaged in the remaining casing section such that the optical axes of the first and second telescopic optical systems are movable in a common geometric plane by relatively sliding one of the casing sections with respect to the remaining casing section.

In accordance with a third aspect of the invention, there is provided a binocular telescope with a photographing function, comprising a pair of telescopic optical systems, each of which includes an optical objective system, an optical erecting system, and an optical ocular system to thereby observe an object, both the optical erecting and ocular systems being relatively movable with respect to the optical objective system along an optical axis of the corresponding telescopic optical system; a digital camera system including a solid-state image sensor and a photographing optical system associated with each other such that the object is formed as a photographed image on a light-receiving surface of the solid-state image sensor through the photographing optical system; a tubular shaft rotatably provided between the telescopic optical systems; and a manually-operable focussing mechanism associated with the pair of telescopic optical systems such that a rotational movement of the tubular shaft is converted into a relative translational movement between both the optical erecting and ocular systems, included in each telescopic optical system, and the optical objective system, included in each telescopic optical system, to thereby bring the object into focus through the pair of telescopic optical systems. The photographing optical system is housed in the tubular shaft, and the solid-state image sensor is aligned with the photogaphing optical system so as to be spaced a given distance away from a rear end of the photographing optical system.

Regarding the third aspect of the invention, the manually-operable focussing mechanism is preferably further associated with the photographing optical system such that the rotational movement of the tubular shaft is converted into a translational movement of the photographing optical system with respect to the solid-state image sensor, to thereby focus the object on a light-receiving surface of the solid-state image sensor, whereby the focusing of the pair of telescopic optical systems is operationally connected to the focusing of the photographing optical system.

Note, the binocular telescope with the photographing function may be characterized by the fact that the aforesaid conditions are satisfied.

In the third aspect of the invention, the manually-operable focussing mechanism may be constituted such that a linear relationship is established between the rotational movement of the tubular shaft and the translational movement of the photographing optical system. In this case, the manually-operable focussing mechanism may be further constituted such that a linear relationship is established between the rotational movement of the tubular shaft and the relative translational movement between both the optical erecting and ocular systems and the optical objective system.

Alternatively, the manually-operable focussing mechanism may be constituted such that a nonlinear relationship is established between the rotational movement of the tubular shaft and the translational movement of the photographing optical system. In this case, the manually-operable focussing mechanism may be further constituted such that a nonlinear relationship is established between the rotational movement of the tubular shaft and the relative translational movement between both the optical erecting and ocular systems and the optical objective system.

The binocular telescope with the photographing function may further comprise a casing for receiving the pair of telescopic optical systems, and the casing may include two casing sections movably engaged with each other such that the respective telescopic optical systems are assembled in the casing sections so that a distance between the optical axes of the telescopic optical systems is adjustable by relatively moving one of the casing sections with respect to the remaining casing section. Preferably, one of the casing sections is slidably engaged in the remaining casing section such that the optical axes of the first and second telescopic optical systems are movable in a common geometric plane by relatively sliding one of the casing sections with respect to the remaining casing section.

BRIEF DESCRIPTION OF THE DRAWINGS

The objects and other objects of the invention will be better understood from the following descriptions, with reference to the accompanying drawings, in which.

DESCRIPTION OF THE PREFERRED EMBODIMENTS

Figure 1:
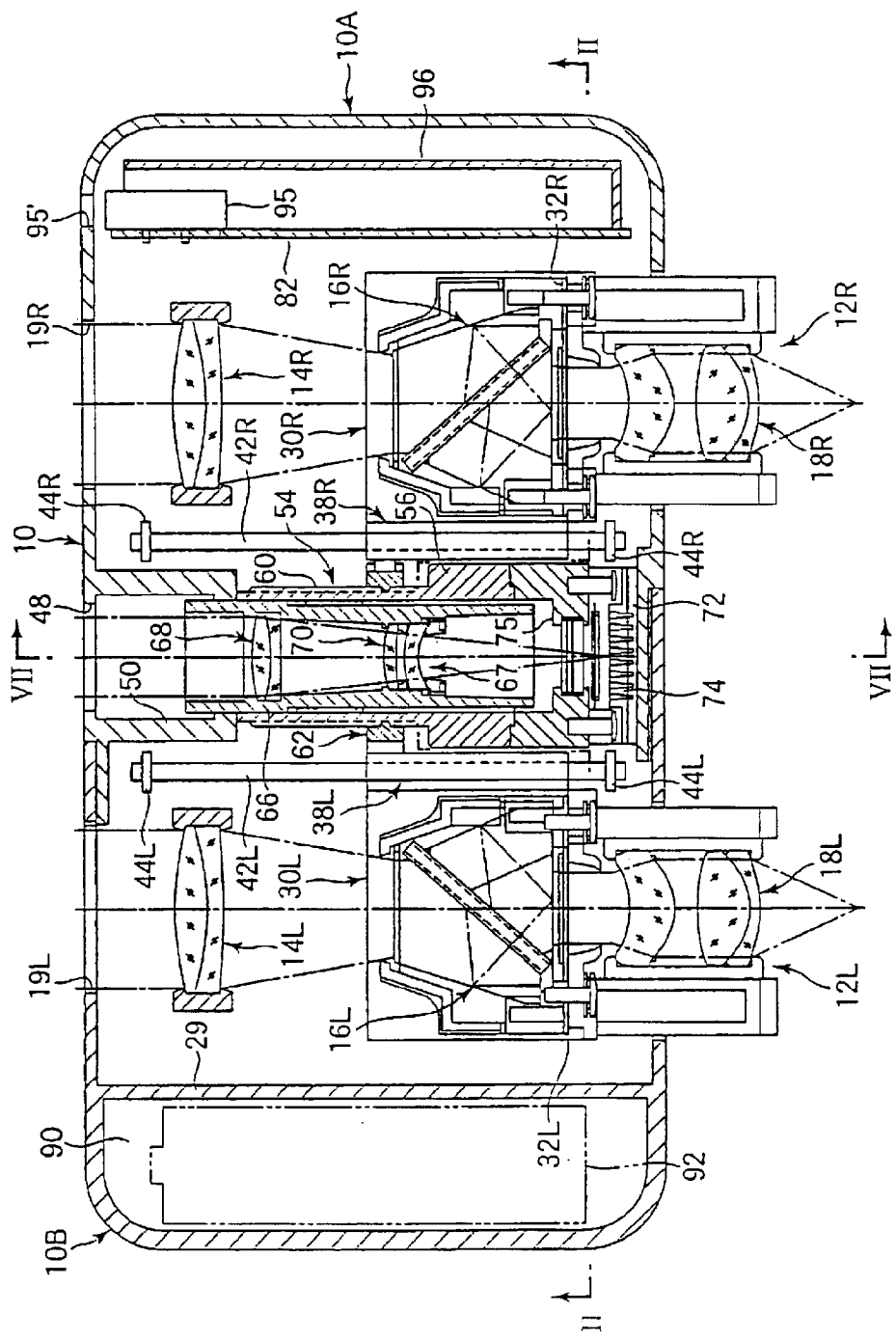
FIG. 1 is a cross-sectional plan view of a binocular telescope containing a digital camera according to the present invention.
Figure 2:
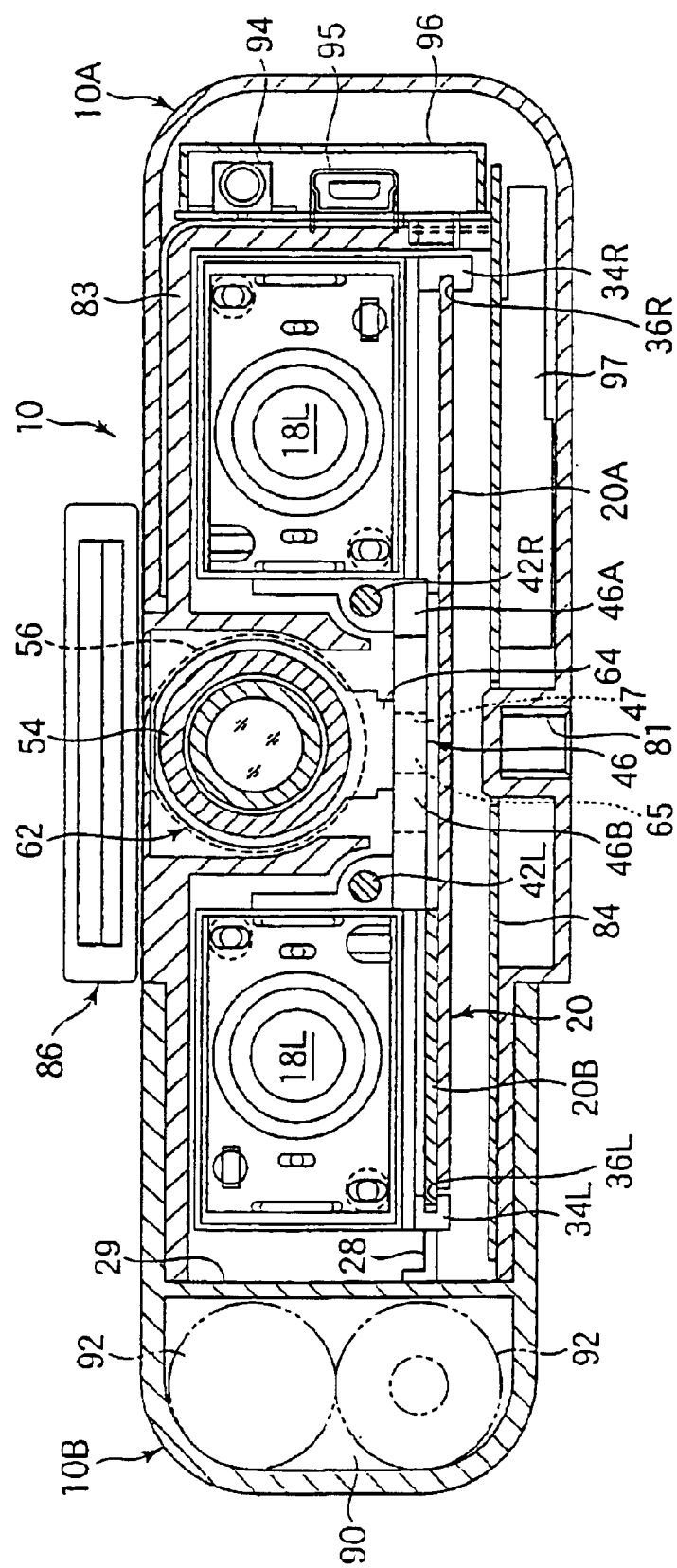
FIG. 2 is a cross-sectional view taken along line II–II of FIG. 1, in which a movable casing section is shown at a retracted position with respect to a main casing section.

FIG. 1 shows an inner arrangement of a binocular telescope containing a digital camera, constituted according to the present invention, and FIG. 2 shows a cross-section taken along line II—II of FIG. 1.

The binocular telescope with the digital camera comprises a casing 10 including a main casing section 10A and a movable casing section 10B, and a pair of telescopic lens systems 12R and 12L housed in the casing 10 and optically identical to each other. The respective telescopic lens system 12R and 12L are provided for the right and left eyes of a human, and are symmetrically arranged with respect to a middle line therebetween.

The right telescopic lens system 12R is assembled in the main casing section 10A, and includes an objective lens system 14R, an erecting prism system 16R, and an ocular lens system 18R. A front wall of the main casing section 10A is formed with a window 19R, which is aligned with the objective lens system 14R of the right telescopic lens system.

The left telescopic lens system 12R is assembled in the movable casing section 10B, and includes an objective lens system 14L, an erecting prism system 16L, and an ocular lens system 18L. A front wall of the movable casing section 103 is formed with a window 19L, which is aligned with the objective lens system 14L of the left telescopic lens system.

The movable casing section 10B is slidably engaged with the main casing section 10A, such that they are relatively moved from each other. Namely, the movable casing section 10B can be moved in relation to the main casing section 10A between a retracted position as shown in FIG. 2 and a maximum-extended position as shown in FIG. 3.

A suitable friction force acts on the sliding surfaces of both the casing sections 10A and 10B, and thus a certain extension force must be exerted on the movable casing section 10B before the movable casing section 10B can be extended from the main casing section 10A. Similarly, a certain extraction force must be exerted on the movable casing section 10B before the movable casing section 10B can be retracted onto the main casing section 10A. Thus, it is possible for the movable casing section 10B to hold or stay still at an optional position between the retracted position (FIG. 2) and the maximum-extended position (FIG. 3), due to the suitable friction force acting on the sliding surfaces of both the casing sections 10A and 10B.

Figure 3:
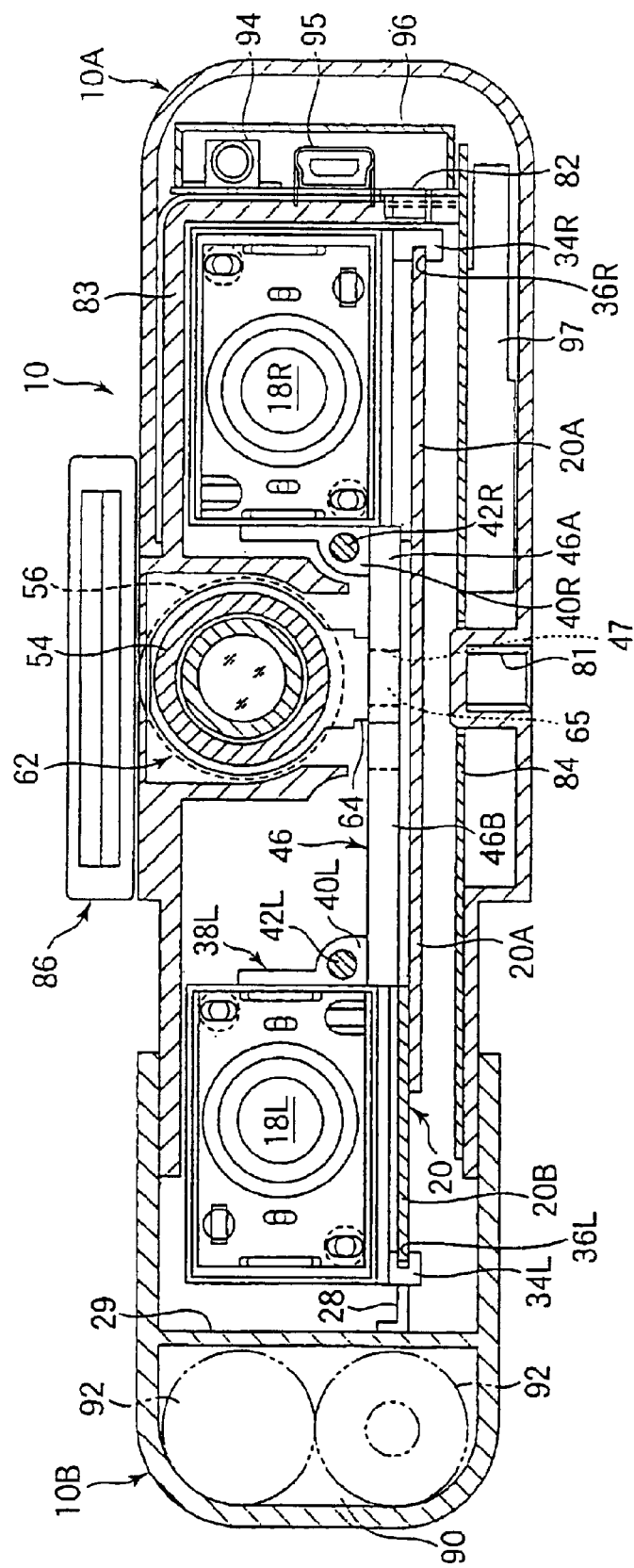
FIG. 3 is a cross-section view, similar to FIG. 2, in which the movable casing section is shown at an extended position with respect to a main casing section.

As is apparent from FIGS. 2 and 3, when the movable casing section 103 is extended from the main casing section 10A, the left telescopic lens system 12L is moved together with the movable casing section 10B, but the right telescopic lens system 12R stays in the main casing section 10A. Thus, by extending the movable casing section 10B from the main casing section 10A, it is possible to adjust a distance between the optical axes of the right and left telescopic lens systems 12R and 12L such that the distance can coincide with an interpupillary distance of a user. Namely, it is possible to perform the interpupillary adjustment by relatively sliding the movable casing section 10B in relation to the main casing section 10A.

In this embodiment, the objective lens system 14R of the right telescopic lens system 12R is housed at a fixed position with respect to the main casing section 10A, but both the erecting prism system 16R and the ocular lens system 1R are movable back and forth with respect to the objective lens system 14R, whereby an object to be observed through the right telescopic lens system 12R is brought into focus. Similarly, the objective lens system 14L of the left telescopic lens system 12L is housed at a fixed position with respect to the movable casing section 10B, but both the erecting prism system 16L and the ocular lens system 18L are movable back and forth with respect to the objective lens system 14L, whereby an object to be observed through the left telescopic lens system 12L is brought into focus.

Figure 4:
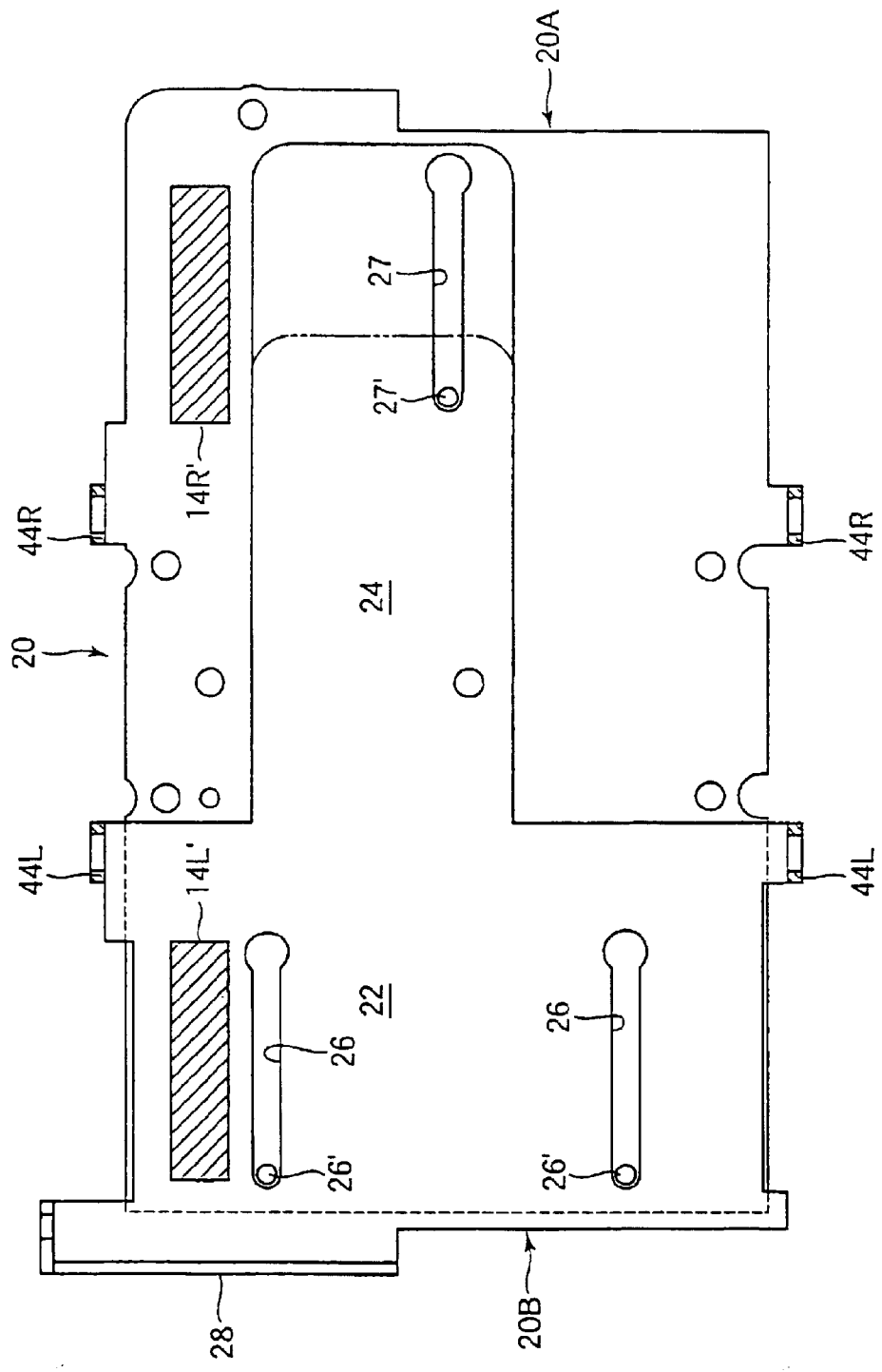
FIG. 4 is a plan view of a support-plate assembly housed in a casing formed by the main and movable casing sections.

For the purpose of both the interpupillary adjustment and the focussing of the right and left telescopic lens systems 12R and 12L, the casing 10 is provided with a support-plate assembly 20, as shown in FIG. 4, and the right and left telescopic lens systems 12R and 12L are mounted on the support-plate assembly 20 in the manner stated in detail hereinafter. Note, in FIG. 1, although the support-plate assembly 20 is visible, it is not shown in order to avoid an overly complex illustration.

As shown in FIG. 4, the support-plate assembly 20 comprises a rectangular plate member 20A, and a slide plate member 20B slidably laid on the rectangular plate member 20A. The rectangular plate member 20A has a longitudinal length, and a lateral length shorter than the longitudinal length. The slide plate member 20B includes a rectangular section 22 having a width substantially equal to the lateral length of the rectangular plate member 20A, and a section 24 integrally extended from the section 22, both the sections 22 and 24 having a longitudinal length substantially equal to the longitudinal length of the rectangular plate member 20A.

The slide plate member 20B is provided with a pair of guide slots 26 formed in the rectangular section 22, and a guide slot 27 formed in the extended section 24. On the other hand, a pair of stub elements 26' and a stub element 27' are securely attached to the rectangular plate member 20A, such that the pair of stub elements 26' is slidably received in the pair of guide slots 26, and that the stub element 27' is slidably received in the guide slot 27. The guide slots 26 and 27 are extended so as to be parallel to each other, and each slot has a length corresponding to the movement distance of the movable casing section 10B between the retracted position (FIG. 2) and the maximum-extended position (FIG. 3).

As shown in FIGS. 2 and 3, the support-plate assembly 20 is arranged in the casing 10 so as to be spaced apart from the bottom of the casing 10. Although not shown, the rectangular plate member 20A is securely connected to the main casing section 10A in a suitable manner. The slide plate member 20B has a protrusion 28 integrally protruding from rectangular section 22, and the protrusion 28 is securely connected to a partition 29 provided in the movable casing section 10B, as shown in FIGS. 2 and 3. Thus, when the movable casing section 10B is moved with respect to the main casing section 10A, the slide plate member 20B can be moved together with the movable casing section 10B.

The objective lens system 14R of the right telescopic lens system 12R is securely fixed on the rectangular plate member 20A at a hatched area indicated by reference 14R', and the objective lens system 14L of the left telescopic lens system 12L is securely fixed on the rectangular section 22 of the slide plate member 20B at a hatched area indicated by reference 14L'.

Figure 5:
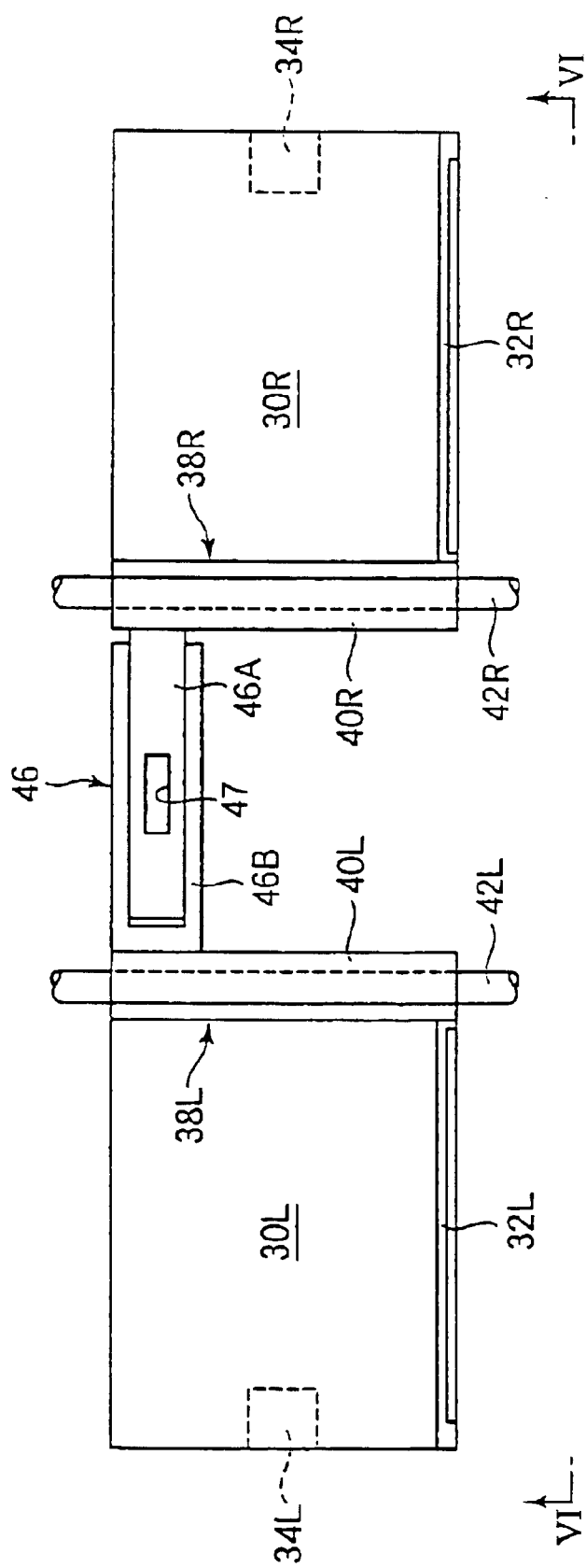
FIG. 5 is a plan view of the right and left mount plates arranged above the support-plate assembly.

FIG. 5 shows right and left mount plates 30R and 30L arranged above the support-plate assembly 20, and the respective erecting prism systems 16R and 16L are mounted on the right and left mount plates 30R and 30L, as shown in FIG. 1. Also, as is apparent from FIGS. 5 and 6, the respective right and left mount plates 30R and 30L have upright plates 32R and 32L provided along the rear side edges thereof, and the respective ocular lens systems 18R and 18L are attached to the upright plates 32R and 32L, as shown in FIG. 1.

The right mount plate 30R is movably supported by the rectangular plate member 20A such that both the erecting prism system 16R and the ocular lens system 18R are movable back and forth with respect to the objective lens system 14R. Similarly, the left mount plate 30L is movably supported by the slide plate member 20B such that both the erecting prism system 16L and the ocular lens system 18L are movable back and forth with respect to the objective lens system 14L.

Figure 6:
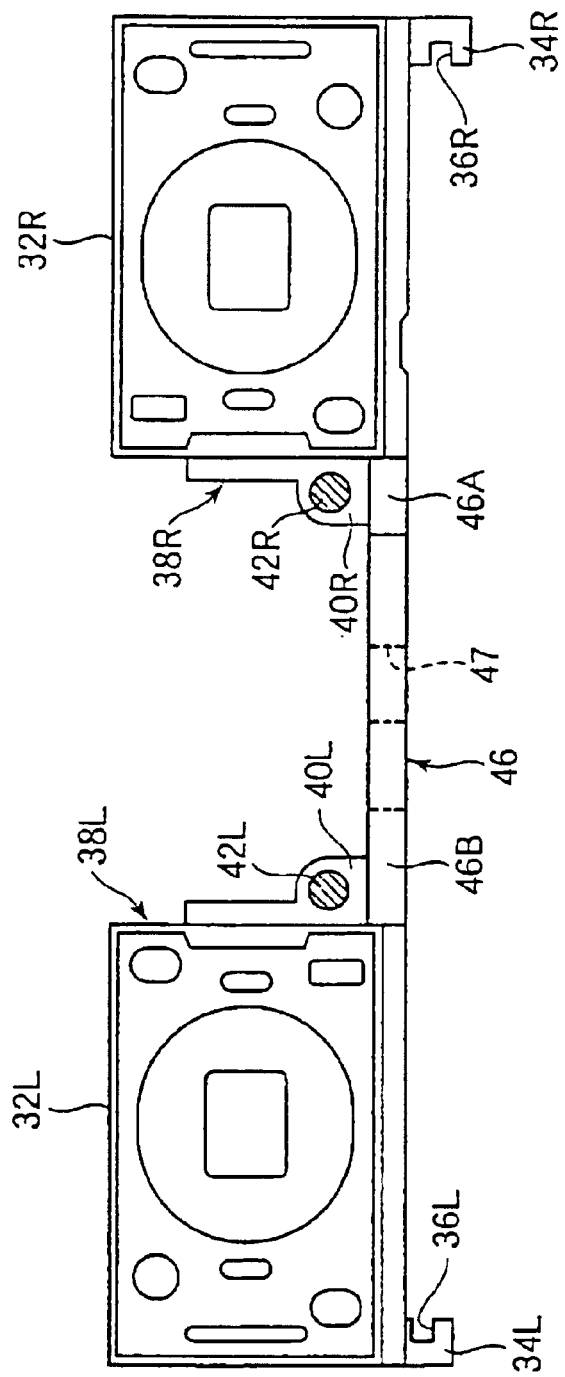
FIG. 6 is an elevational view observed along line VI—VI of FIG. 5.

In particular, the right mount plate 30R is provided with a guide shoe 34R secured to the underside thereof in the vicinity of the right side edge thereof, as shown in FIGS. 5 and 6. The guide shoe 34R is formed with a groove 36R (FIG. 6), which slidably receives a right side edge of the rectangular plate member 20A, as shown in FIGS. 2 and 3. Also, the right mount plate 30R has a side wall 38R provided along a left side edge thereof, and a lower portion of the side wall 38R is formed as a swollen portion 40R having a through bore for slidably receiving a guide rod 42R. The ends of the guide rod 42R are securely supported by a pair of fixture pieces 44R integrally protruding from the rectangular plate member 20A (FIGS. 1 and 4). Thus, the right mount plate 30R, carrying both the erecting prism system 16R and the ocular lens system 18R, is translationally movable back and forth with respect to the objective lens system 14R.

Similarly, the left mount plate 30L is provided with a guide shoe 34L secured to the underside thereof in the vicinity of the left side edge thereof, as shown in FIGS. 5 and 6. The guide shoe 34L is formed with a groove 36L (FIG. 6), which slidably receives a left side edge of the slide plate member 20B, as shown in FIGS. 2 and 3. Also, the left mount plate 30L has a side wall 38L provided along a right side edge thereof, and a lower portion of the side wall 38L is formed as a swollen portion 40L having a through bore for slidably receiving a guide rod 42L. The ends of the guide rod 42L are securely supported by a pair of fixture pieces 44L integrally protruding from the slide plate member 20B (FIGS. 1 and 4). Thus, the left mount plate 30L, carrying both the erecting prism system 16L and the ocular lens system 18L, is translationally movable back and forth with respect to the objective lens system 14L.

Note, as stated above, although the support-plate assembly 20 is not shown in FIG. 1, only the fixture pieces 44R and 44L are illustrated.

With the above-mentioned arrangement, it is possible to perform the interpupillary adjustment of the right and left telescopic lens systems 12R and 12L by moving the movable casing section 10B from and toward the main casing section 10A. Further, it is possible to perform the focussing of the right telescopic lens system 12R by translationally moving the mount plate 30R back and forth with respect to the objective lens system 14R, and it is possible to perform the focussing of the left telescopic lens system 12L by translationally moving the mount plate 30L back and forth with respect to the objective lens system 14L.

In order to simultaneously move the right and left mount plates 30R and 30L such that a distance between the right and left mount plates 30R and 30L is variable, the mount plates 30R and 30L are interconnected to each other by an expandable coupler 46.

In particular, as best shown in FIG. 5, the expandable coupler 46 includes a rectangular lumber-like member 46A, and a forked member 46B in which the lumber-like member 46A is slidably received. The lumber-like member 46A is securely attached to the underside of the swollen portion 40R of the side wall 38R at the forward end thereof, and the forked member 46B is securely attached to the underside of the swollen portion 40L of the side wall 38L at the forward end thereof. Both the members 46A and 46B have a length which is greater than the distance of movement of the movable casing section 10B, between its retracted position (FIG. 2) and its maximum extended position (FIG. 3). Namely, even though the movable casing section 10B is extended from the retracted position (FIG. 2) to the maximum extended position (FIG. 3), the slidable engagement is maintained between the members 46A and 46B. Thus, the simultaneous translational movement of both the mount plates 30R and 30L, and therefore, both the right optical system (16R, 18R) and the left optical system (16L, 18L), can be assured at all times.

Note, as best shown in FIG. 5, the lumber-like member 46A is formed with a rectangular bore 47, which is utilized for the purpose stated hereinafter.

Figure 7:
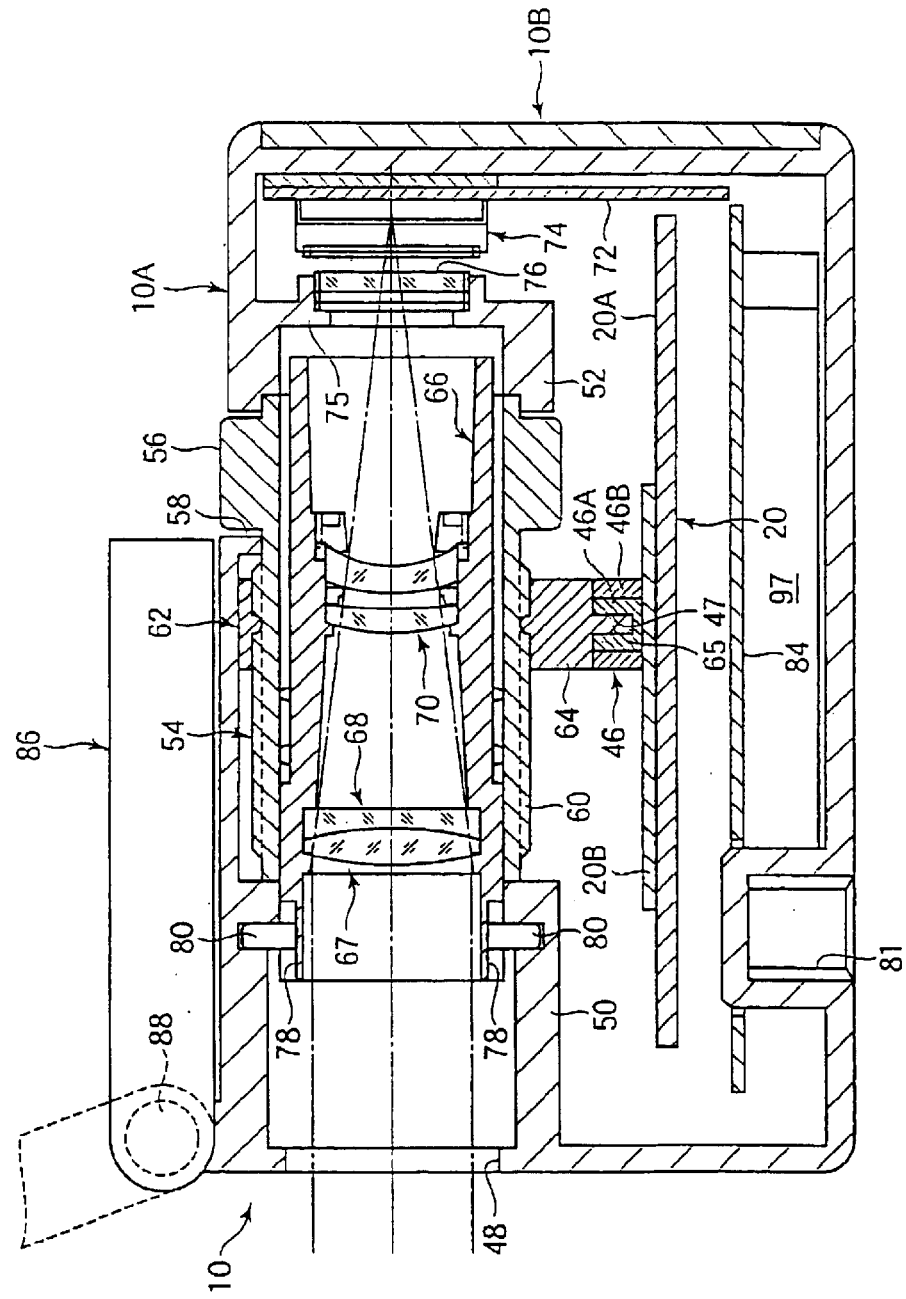
FIG. 7 is a cross-sectional view taken along line VII—VII of FIG. 1.

FIG. 7 shows a cross-section taken along line VII—VII of FIG. 1. As is apparent from FIGS. 1 and 7, the main casing section 10A has a circular window 48 formed in the front wall thereof, and the circular window 48 is at a center position of the front wall of the casing 10 when the movable casing section 10B is positioned at the retracted position (FIG. 2).

As shown in FIGS. 1 and 7, the main casing section 10A has an inner front sleeve member 50 integrally protruding from the inner wall surface of the front wall thereof to surround the circular window 48, and the inner front sleeve member 50 is integrated with the top wall of the main casing section 10A. Also, an inner rear sleeve member 52 is integrally suspended from the top wall of the main casing section 10A, and is aligned with the inner front sleeve member 50.

A tubular shaft 54 is rotatably provided between and supported by the inner front and rear sleeve members 50 and 52, and has a rotary wheel 56 integrally formed therewith. As shown in FIG. 7, a rectangular opening 58 is formed in the top wall of the main casing section 10A, a portion of the rotary wheel 56 is exposed to the outside through the rectangular opening 58. Thus, it is possible to rotate the tubular shaft 54 by manually driving the exposed portion of the rotary wheel 56 with a user's finger.

The tubular shaft 54 has a male screw 60 formed around the outer peripheral wall surface thereof between the front end thereof and the rotary wheel 55, and an annular member 62 is threaded onto the male screw 60 of the tubular shaft 54. As shown in FIGS. 2, 3, and 7, the annular member 62 has a radial extension 64 integrally formed therewith, and a rectangular projection 65 is integrally projected from the radial extension 64. The rectangular projection 65 is inserted and fitted into the rectangular bore 47 formed in the lumber-like member 46A of the expandable coupler 46.

With the above-mentioned arrangement, while the tubular shaft 54 is rotated by manually driving the rotary wheel 56, the annular member 62 is moved along the longitudinal central axis of the tubular shaft 54, resulting in the simultaneous translational movement of both the mount plates 30A and 30B, and therefore, both the right optical system (16R, 18R) and the left optical system (16L, 18L). Namely, the tubular shaft 54 and the annular member 62, which are threadedly engaged with each other, form a movement-conversion mechanism for converting the rotational movement of the rotary wheel 56 into the translational movement of both the right optical system (16R, 18R) and the left optical system (16L, 18L), and the movement-conversion mechanism is utilized as a focussing mechanism for both the right and left telescopic lens systems 12R and 12L.

Each of the right and left telescopic lens systems 12R and 12L is optically designed such that an object at infinity is brought into focus when both the erecting lens system (16R, 16L) and the ocular lens system (18R, 18L) are closest to the corresponding objective lens system (14R, 14L). Accordingly, before a near object can be brought into focus, it is necessary to move both the erecting lens system (16R, 16L) and the ocular lens system away from the corresponding objective lens system (14R, 14L). When both the erecting lens system (16R, 16L) and the ocular lens system are farthest from the corresponding objective lens system (14R, 14L), it is possible to bring a nearest object into focus.

As best shown in FIGS. 1 and 7, a lens barrel 66 is provided within the tubular shaft 54, and a photographing lens system 67 including a first lens system 68 and a second lens system 70 is held in the lens barrel 66. On the other hand, an image-sensor control circuit board 72 is securely attached to the inner wall surface of the rear wall of the main casing section 10A, and a CCD image sensor 74 is mounted to the image-sensor control circuit board 72 such that a light-receiving surface of the CCD image sensor 74 is aligned with the photographing lens system 67 held in the lens barrel 66. The inner rear sleeve member 52 has an inner annular flange 75 formed at the rear end thereof, and an optical low-pass filter 76 is fitted into the inner annular flange 75. In short, the photographing lens system 67, the CCD image sensor 74, and the optical low-pass filter 76 form a digital camera, and an object to be photographed is focussed on the light-receiving surface of the CCD image sensor 74 through the photographing lens system 61 and the optical low-pass filter 76.

For example, before a nearest object, which is situated 1.5 meters ahead of the digital camera, can be photographed as a focussed image, similar to a case of a usual digital camera, it is necessary to incorporate a focussing mechanism into the photographing lens system 67. Further, the focussing mechanism for the photographing lens system 67 must be operationally connected and linked to the focussing mechanism for the right and left telescopic lens Systems 12R and 12L, because the telescopic lens systems 12R and 12L are utilized as a view finder system for the contained digital camera. Namely, when an object is observed as a focussed image through the right and left telescopic lens systems 12R and 12L, the observed object must be focussed on the light-receiving surface of the CCD image sensor 74 through the photographing lens system 67.

To this end, respective female and male screws are formed around the inner peripheral wall surface of the tubular shaft 54 and the outer peripheral wall surface of the lens barrel 66, such that the lens barrel 66 is in threaded-engagement with the tubular shaft 54. The front end portion of the lens barrel 66 is inserted into the inner front sleeve member 50, and a pair of key grooves 78 is diametrically formed in the front end portion of the lens barrel 66, each of the key grooves 78 extending over a predetermined distance measured from the front end edge thereof. On the other hand, a pair of bores is diametrically formed in the inner wall of the inner front sleeve member 50, and two pin elements 80 are planted in the bores in pair so as to be engaged in the key grooves 78, as shown in FIG. 7, thereby preventing a rotational movement of the lens barrel 66.

Thus, when the tubular shaft 54 is rotated by manually driving the rotary wheel 56, the lens barrel 66 is translationally moved along the optical axis of the photographing lens system 67 due to the threaded-engagement between the tubular shaft 54 and the lens barrel 66. Namely, the female and male screws, which are formed around the inner peripheral wall surface of the tubular shaft 54 and the outer peripheral wall surface of the lens barrel 66, constitute a movement-conversion mechanism for converting the rotational movement of the rotary wheel 56 into the translational movement of the lens barrel 66, and this movement-conversion mechanism is utilized as the focussing mechanism for the photographing lens system 67.

The male screw 60, formed around the outer peripheral surface of the tubular shaft 54, is formed as a reversed screw with respect to the female screw formed around the inner peripheral surface of the tubular shaft 54. Accordingly, when both the erecting prism system (16R, 16L) and the ocular lens system (18R, 18L) are moved rearward, away from the corresponding objective lens system (14R, 14L) by manually driving the rotary wheel 56, the lens barrel 66 is moved forward, away from the CCD image sensor 74. Thus, when the rearward movement of the both the erecting prism system (16R, 16L) and the ocular lens system (18R, 18L) are performed so as to bring a near object into focus in the telescopic lens system (12R, 12L), it is possible to focus the observed near object on the light-receiving surface of the CCD image sensor 74 due to the forward movement of the lens barrel 66, and therefore, the photographing lens system 67.

Note, of course, the male screw 60, formed around the outer peripheral surface of the tubular shaft 54, exhibits a screw pitch, which is determined in accordance with the optical characteristics of the right and left telescopic lens systems 12R and 12L, and the female screw, formed around the inner peripheral surface of the tubular shaft 54, exhibits a screw pitch, which is determined in accordance with the optical characteristics of the photographing lens system 67.

As shown in FIGS. 2, 3, and 7, a female-threaded bore 81 is formed in the bottom wall of the main casing section 10A, and is used to mount the binocular telescope with the digital camera on a tripod head. Namely, when the binocular telescope with the digital camera is mounted on the tripod head, the female-threaded bore 81 is threadedly engaged with a male screw of the tripod head. As is apparent from FIG. 2, when the movable casing section 10B is at the retracted position, the female-threaded bore 81 is positioned at a middle point of the retracted casing 10 and beneath the optical axis of the photographing lens system 67. Also, as is apparent from FIG. 7, the female-threaded bore 81 is contiguous with the front bottom edge of the main casing section 10A.

As shown in FIGS. 1, 2, and 3, an electric power source circuit board 82 is provided in the right end portion of the main casing section 10A, and is attached to a frame structure 83 securely housed in the main casing section 10A. Also, as shown in FIGS. 2, 3, and 7, a main control circuit board 84 is provided in the main casing section 10A, and is arranged beneath the support-plate assembly 20. Although not illustrated, the main control circuit board 84 is suitably and securely supported by the bottom of the main casing section 10A. Various electronic elements, such as a microcomputer, memory circuits, and so on, are mounted on the main control circuit board 84.

In this embodiment, as is apparent from FIGS. 2, 3, and 7, an LCD (Liquid Crystal Display) panel unit 86 is arranged on the top wall of the main casing section 10A. The LCD panel unit 86 is rotatably mounted on a pivot shaft 88 which is suitably supported by the top wall of the main casing section 10A, and which extends along the top front edge thereof. The LCD panel unit 86 is usually positioned at a retracted position shown by a solid line in FIG. 7, such that the display screen of the LCD panel unit 86 is directed to the top wall surface of the main casing section 10A. Thus, when the LCD unit 86 is positioned at the retracted position, it is impossible for a user or spectator to view the display screen of the LCD unit 86. When the LCD panel unit 86 is manually rotated from the retracted position to a display position as partially shown by a broken line in FIG. 7, it is possible for the user or spectator to view the display screen of the LCD panel unit 86.

As shown in FIGS. 1, 2 and 3, the left end portion of the movable casing section 10B is partitioned by the partition 29, thereby defining a battery chamber 90 for receiving two batteries 92. The electric power source circuit board 82 is supplied with electric power from the batteries 92 through a flexible electric power supply cord (not shown), and then the image-sensor control circuit board 72, the main control circuit board 84, the LCD panel unit 86 and so on are supplied with electric powers from the electric power source circuit board 82 through flexible electric power supply cords (not shown).

As best shown in FIGS. 2 and 3, two connector terminals 94 and 95 are mounted on the electric power source circuit board 82, and are accessible from outside through two access openings formed in the front wall of the main casing section 10A. Note, in FIG. 1, only one of the two access openings, which is provided for the connector terminal 95, is indicated by reference 95'. In this embodiment, the connector terminal 94 is used as a video connector terminal for connecting the digital camera to a domestic TV set, and the connector terminal 95 is used as a USB (Universal Serial Bus) connector terminal for connecting the digital camera to a personal computer. As shown in FIGS. 1, 2, and 3, the electric power source circuit board 82 is covered together with the connector terminals 94 and 95, with an electromagnetic shielding 96 made of a suitable electric conductive material, such as copper, steel or the like.

As shown in FIGS. 2, 3, and 7, a suitable memory card driver, such as a CF (Compact Flash) card driver 97, is mounted on the underside of the main control circuit board 84, and is arranged in the space between the bottom wall of the main casing section 10B and the main control circuit board 84. A memory card or CF card is detachably loaded in the CF card driver 97.

Although not shown in the drawings, the binocular telescope with the digital camera is provided with various switches, such as a power ON/OFF switch, a display switch, a release switch, a selection switch and so on, and these switches are suitably arranged on the top wall of the main casing section 10.

As stated above, an object to be photographed is focussed on the light-receiving surface of the CCD image sensor 74 through the photographing lens system 67 and the optical low-pass filter 76. While the power ON/OFF switch is turned ON, the focussed object image is converted into a frame of analog image-pixel signals by the CCD image sensor 74. While the display switch is turned ON, a frame of thinned analog image-pixel signals is successively read from the CCD image sensor 74 at suitable time intervals, and the thinned analog image-pixel signals in each frame are suitably processed and converted into a frame of digital image-pixel signals. The frame of digital image-pixel signals is successively stored in a frame memory provided on the main control circuit board 84, and is read as a digital video signal from the frame memory. The digital video signal is converted into an analog video signal, and the object image is reproduced as motion picture on the LCD panel unit 86 based on the video signal. Namely, it is possible for a user to monitor the object to be photographed on the LCD panel unit 86.

When the release switch is turned ON, a frame of full analog still image-pixel signals is read from the CCD image sensor 74 without being thinned, and is suitably processed and converted into a frame of full digital still image-pixel signals. Then, the frame of full digital still image-pixel signals is stored in the frame memory of the main control circuit board 84, and is subjected to suitable image processings. Thereafter, the processed digital still image-pixel signals for one frame are stored in the CF card memory, loaded in the CF card memory driver 97, in accordance with a given format.

When a reproduction mode is selected by operating the selection switch, the digital still image-pixel signals in each frame are thinned and read from the CF card memory of the CF card memory driver 97, and are processed to thereby produce a video signal. Then, the photographed image is reproduced as a still image on the LCD panel unit 86, based on the video signal. Optionally, the video signal may be fed to a domestic TV set through the video connector terminal 94, to reproduce the photographed image on a domestic TV set.

Also, the digital still image-pixel signals in each frame may be fed from the CF memory card to a personal computer with a printer through the UBS connector terminal 95, to thereby print the photographed image as a hard copy by using the printer. Of course, when the personal computer is provided with a CF memory card driver, the CF memory card, unloaded from the CF memory card driver 97, may be loaded in the CF memory card driver of the personal computer.

As stated above, in this embodiment, the photographing lens system 67 is optically designed such that a nearest object, which is situated 1.5 meters ahead of the digital camera, can be brought into focus, using the manually-operated focussing mechanism. Under these conditions, before a desirable focussing accuracy can be obtained, it is necessary to properly and optimally determine the field depth of the photographing lens system 67, which is defined by a focal length "f" of the photographing lens system 67, a f-number F of the photographing lens system 67, a diameter δ of the permissible circle of confusion of the CCD image sensor 74, and so on.

As discussed hereinbefore, in a camera using a 35 mm silver halide film, the diameter δ of the permissible circle of confusion is defined as being approximately $\frac{1}{1000}$ of the diagonal line length of the film frame. However, in a digital camera using the CCD image sensor 74, the diameter δ of the permissible circle of confusion is defined as follows:

$$\delta = aP$$

Herein: "P" is a pixel pitch of the CCD image sensor 74; and
"a" is a suitable constant.

When the diameter δ of the permissible circle of confusion is simply defined as the pixel pitch of the CCD image sensor 74, of course, a setting of "1" is given to the constant "a". In this embodiment, since the optical low-pass filter 76 is incorporated in the CCD image sensor 74, the constant "a" may be selected from a range between about "1.3" and about "3.0".

In particular, when the optical low-pass filter 76 is not incorporated in the CCD image sensor 74, and when an object to be photographed exhibits a spatial frequency coinciding with the pixel pitch of the CCD image sensor 74, moire fringes are produced on a reproduced image at the area exhibiting the spatial frequency concerned. In short, a high spatial frequency component, which is nearly equal to the pixel pitch of the CCD image sensor, is removed from the light beam captured by the photographing lens system 67, due to the existence of the optical low-pass filter 76, thereby preventing the production of the moire fringes. Thus, it is possible to give the setting of more than "1" to the constant "a" (from approximately "1.3" to approximately "3.0").

When the respective focal depth and field depth of the photographing lens system 67 are represented by reference "$D_i$" and "$D_o$", the focal depth "$D_i$" and the field depth "$D_o$" are defined as follows:

$$D_i = aPF$$

$$D_o = f^2/D_i = f^2/aPF$$

On the other hand, the focal length "f" of the photographing lens system 67 is defined as follows:

$$f = y/\tan(\omega/T)$$

Herein: "y" represents a maximum image height (mm) of the CCD image sensor 74, which is defined as one-half of a diagonal line length of the light-receiving surface of the CCD image sensor 74;

"ω" represents a half field angle (rad) of the right and left telescopic lens-systems 12R and 12L; and "T" represents a field ratio of the half field angle "ω" to a half field angle "θ" (rad) of the photographing lens system 67 (T=ω/θ).

Accordingly, the field depth "$D_o$" of the photographing lens system 67 may be represented as follows:

$$D_o = y^2/[\tan^2(\omega/T) \times aPF]$$

Since the right and left telescopic lens systems 12R and 12L are provided for magnifying and observing a far object, a real field angle of the telescopic lens systems 12R and 12L is very narrow. Namely, "ω/T" is very small, and thus it is possible to regard the parameter "tan (ω/T)" as "ω/T" (tan (ω/T)≈ω/T). Also, the constant "a" is suitably selected from the aforesaid range (from approximately "1.3" to approximately "3.0") in accordance with how a frame of digital still image-pixel signals is processed. For example, a value of the constant "a", selected when the digital still image-pixel signals in a frame are processed to be reproduced on either the LCD panel unit 86 or the domestic TV set, is different from a value of the constant "a" selected when the digital still image-pixel signals in a frame are processed to print an image as a hard copy by using a printer associated with a personal computer. Thus, the constant "a" may be omitted from the aforesaid equation.

In short, the aforesaid equation, representing the field depth "$D_o$" of the photographing lens system 67, may be modified as follows:

$$D_o \propto y^2/[(\omega/T)^2 \times PF]$$

Of course, this equation forms a criterion representing the field depth of the photographing lens system 67 when an object in infinity is brought into focus. In general, since a distance, measured from the photographing lens system 67 to an object to be photographed, is expressed in meters, the equation is divided by "1000" as follows:

$$D_o/1000 \propto y^2/[1000 \times PF(\omega/T)^2]$$

Thus, before the focusing mechanism for the photographing lens system 76 can be suitably and properly operated by manually driving the rotary wheel 56, it is necessary to select values of the parameters "y", "ω", "P", "T", and "F" so as to fulfil the following conditional equation:

$$65 < y^2/[1000 \times PF(\omega/T)^2] < 95$$

In this conditional equation, the critical values "65" and "95" are empirically obtained from the accumulation of knowledge on past designs of photographing lens systems, and are well known in the design field of the photographing lens systems. Although the critical values "65" and "95" are somewhat variable, these values form a criterion for suitably and properly performing the focussing of the photographing lens system 67 by the focussing mechanism that is operationally connected to the manually-operated focussing mechanism for the right and left telescopic lens systems 12R and 12L.

If "$y^2/[1000 \times PF(\omega/T)^2]$" is less than the lower critical value "65", it is possible to handle the photographing lens system 67 as a near pan-focus lens system, the focal depth of which is considerably wider. In this case, the aforesaid complex focussing arrangement for operationally connecting the focussing mechanism of the photographing lens system 67 to the focussing mechanism of the right and left telescopic lens systems 12R and 12L is not necessitated. Namely, for example, the lens barrel 66 can be slidably received in the tubular shaft 54 so as to be merely movable between a far-object focussing position and a near-object focussing position, and does not need to have any connection with the focussing mechanism for the right and left telescopic lens systems 12R and 12L. It is determined by the user whether the lens barrel 66 should be positioned at the far-object focusing position or the near-object focussing position. Note, of course, when the photographing lens system 67 is designed as a complete pan-focus lens system, there is no need for the incorporation of the focussing mechanism in the photographing lens system 67.

When values of the parameters "y", "ω", "P", "T", and "F" are selected, various matters should be taken into consideration as stated below.

First, the pixel pitch "P" is variable in accordance with the type of the CCD image sensor 74 being used, and this influences the sensitivity of the CCD image sensor 74 and the f-number "F" of the photographing lens system 67. Namely, in order to make the sensitivity of the CCD image sensor 74 higher, it is necessary to make the pixel pitch "P" of the CCD image sensor 74 larger, i.e. to decrease the number of pixels of the CCD image sensor 74 or it is necessary to make the maximum image height "y" of the CCD image sensor 74 larger.

When the number of pixels of the CCD image sensor 74 is decreased, under the condition where the maximum image height "y" of the CCD image sensor 74 is constant, the quality of a photographed image deteriorates. On the other hand, when the number of pixels of the CCD image sensor 74 is increased, under the condition where the maximum image height "y" of the CCD image sensor 74 is constant, the pixel area corresponding to each pixel is made smaller, and this results in the lowering of the sensitivity of the CCD image sensor 74.

In order to raise the sensitivity of the CCD image sensor 74, the maximum image height "y" of the CCD image sensor 74 must be increased. The increase of the maximum image height "y" results in a large-scale CCD image sensor (74). In this case, if the field angle of the photographing lens system 67 is maintained at a constant, the focal length "f" of the photographing lens system 67 becomes considerably longer, resulting in the need for a very large-scale photographing lens system (67). Also, in general, the sensitivity of a CCD image sensor is lower than that of a silver halide film.

Taking the above-discussed conditions into consideration, it is necessary to give a setting of less than "6" to the f-number F of the photographing lens system 67 (F<6).

To give a setting of less than the critical value "65" to "$y^2/[1000 \times PF (\omega/T)^2]$" means that "$y/(\omega/T)$" is made smaller, that the pixel pitch "P" is made larger, or that the f-number "F" is made larger. To make "$y/(\omega/T)$" smaller means that the maximum image height "y" is smaller or that the field ratio "T" is made smaller. As already discussed, when the maximum image height "y" is made smaller without decreasing the number of pixels of the CCD image sensor 74, the sensitivity of the CCD image sensor 74 is lowered. When the pixel pitch of the CCD image sensor 74 is increased, i.e. when the number of pixels of the CCD image sensor 74 is decreased, to maintain the sensitivity of the CCD image sensor 74, the quality of a photographed image is deteriorated. On the other hand, when the field ratio "T" is made too large, the photographing area of the photographing lens system 67 becomes larger than a view area of both the right and left telescopic lens systems 12R and 12L, and thus the right and left telescopic lens systems 12R and 12L cannot be utilized as an optical view finder lens system for the photographing lens system 67. Also, the increase of the pixel pitch "P" and the f-number "F" has the undesirable effects, as already discussed.

When "$y^2/[1000 \times PF(\omega/T)^2]$" is more than the upper critical value "95", the focal depth of the photographing lens system 67 becomes considerably narrower. In this case, it is very difficult to suitably and properly perform the focussing of the photographing lens system 67 by using the focussing mechanism, operationally connected to the manually-operated focussing mechanism for the right and left telescopic lens systems 12R and 12L.

In particular, when the focussing mechanism for both the right and left telescopic lens systems 12R and 12L is operated by manually driving the rotary wheel 56 to thereby bring an object into focus, the focussing accuracy of the focussing mechanism depends on a self-focussing ability of the user's eyes. Namely, by bringing the object into focus with a degree of ±1.0 diopter, it is possible for the user to observe the object as a properly-focussed image due to the self-focussing ability of the user's eyes. In other words, although the object is observed as a properly-focussed image through both the right and left telescopic lens systems 12R and 12L, it is not guaranteed that the observed object is properly focussed on the light-receiving surface of the CCD image sensor 74 through the photographing lens system 67 when "$y^2/[1000 \times PF(\omega/T)^2]$" is more than the upper critical value "95".

In short, when "$y^2/1000 \times PF(\omega/T)^2]$" is more than the upper critical value "95", an automatically-operated (AF) focussing mechanism should be incorporated into the photographing lens system 67 before an object to be photographed can be properly brought into focus through the photographing lens system 67.

In all cases, taking the above-discussed matters into consideration, the values of the parameters "y", "ω", "P", "T", and "F" must be selected such that the aforesaid conditional equation is satisfied before the focusing mechanism for the photographing lens system 67 can be suitably and properly operated in the manual focussing manner.

For example, when a ⅓ inch CCD image sensor (74) is utilized, the parameters "y", "ω", "P", "T", and "F" may be selected as follows:

$y=2.98$ mm $\omega=0.06231$ rad (3.57°)

$P=0.0047$ mm (4.7 $\mu$m)

$T=0.78$ $F=4$

In this case, the value of "$y^2[1000 \times PF(\omega/T)^2]$" is "74".

Also, when a ½.7 inch image sensor (74) is utilized, the parameters "y", "ω", "P", "T", and "F" may be selected as follows:

$y=3.32$ mm $\omega=0.06231$ rad (3.57°)

$P=0.0042$ mm (4.2 $\mu$m)

$T=0.70$ $F=4$

In this case, the value of "$y^2/[1000 \times PF(\omega/T)^2]$" is "83".

Figure 8:
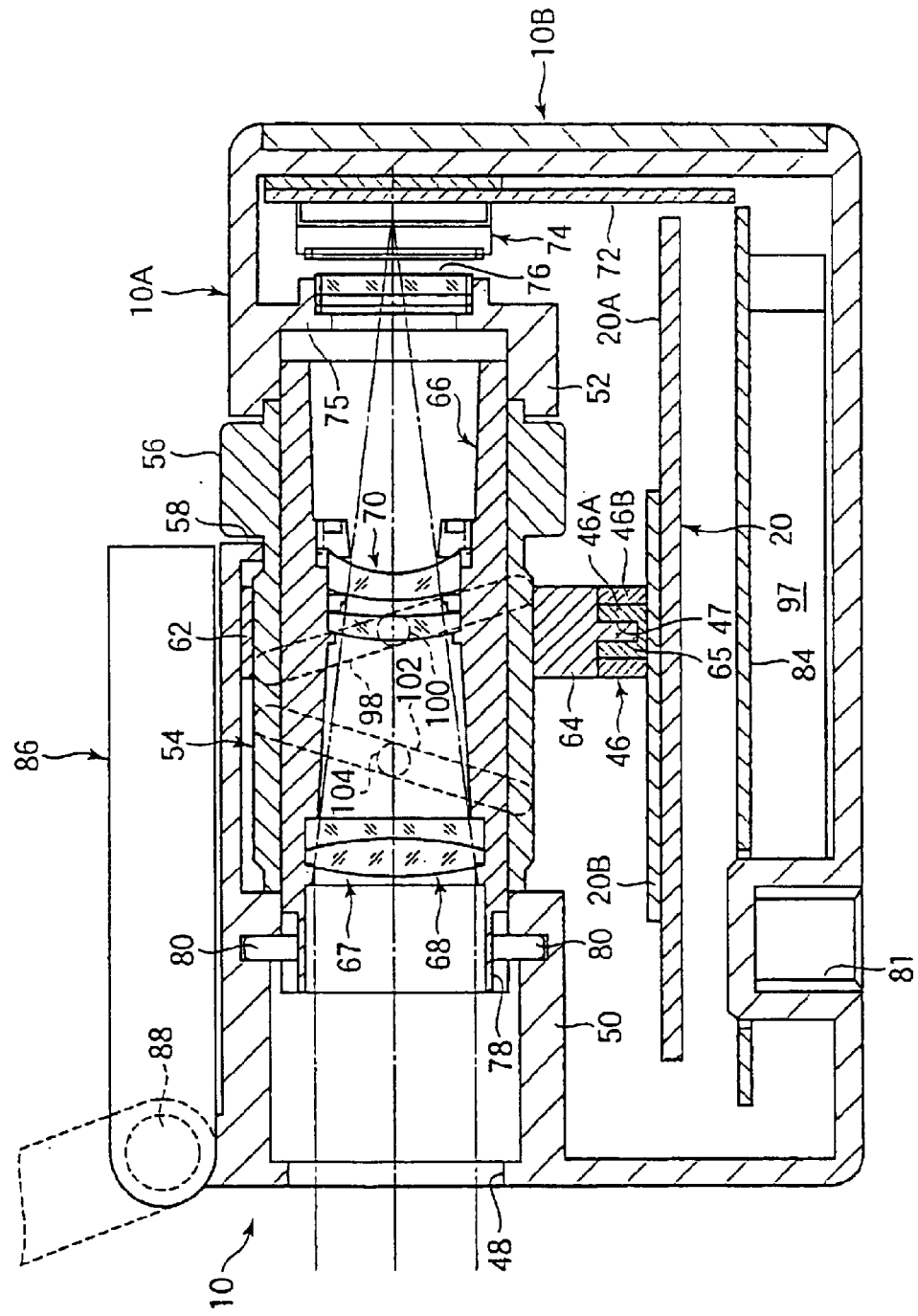
FIG. 8 is a cross-sectional view, similar to FIG. 7, showing a modification of the embodiment shown in FIGS. 1 to 7.

FIG. 8, similar to FIG. 7, shows a modification of the aforesaid embodiment of the binocular telescope containing the digital camera. Note, in FIG. 8, the features similar to those of FIG. 7 are indicated by the same references.

In the modified embodiment shown in FIG. 8, the focussing mechanism or movement-conversion mechanism for both the right and left telescopic lens systems 12R and 12L is formed by a cam groove 98 formed around the outer wall surface of the tubular shaft 54, and a stub-like cam follower 100, which protrudes from the inner wall surface of the annular member 62, and which is engaged in the cam groove 98. Note, in FIG. 8, the cam groove 98 is shown by a broken line as being developed and spread over a plane. Thus, similar to the aforesaid embodiment, the rotational movement of the rotary wheel 56 is converted into a translational movement of both the right optical system (16R, 18R) and the left optical system (16L, 18L).

Also, in the modified embodiment, the focussing mechanism or movement-conversion mechanism for the photographing lens system 67 is formed by a cam groove 102 formed around the inner wall surface of the tubular shaft 54, and a stub-like cam follower 104, which protrudes from the outer wall surface of the lens barrel 66, and which is engaged in the cam groove 102. Note, similar to the cam groove 98, the cam groove 102 is shown by a broken line as being developed and spread over a plane. Thus, similar to the aforesaid embodiment, the rotational movement of the rotary wheel 56 is converted into a translational movement of the lens barrel 66.

As is apparent from FIG. 8, the cam grooves 98 and 102 are reversely oriented with respect to each other. Accordingly, when both the erecting prism system (16R, 16L) and the ocular lens system (18R, 11L) are moved rearward away from the corresponding objective lens system (14R, 14L) by manually driving the rotary wheel 56, the lens barrel 66 is moved forward away from the CCD image sensor 74. Thus, similar to the aforesaid embodiment, when the rearward movement of the both the erecting prism system (16R, 16L) and the ocular lens systems (18R, 18L) is performed so as to bring a near object into focus in the telescopic lens system (12R, 12L), it is possible to focus the observed near object on the light-receiving surface of the CCD image sensor 74 due to the forward movement of the lens barrel 66, and therefore, the photographing lens system 67.

In the aforesaid embodiment as shown in FIGS. 1 to 7, since the focusing mechanism or movement-conversion mechanism for both the right and left telescopic lens systems 12R and 12L is formed by the male and female screws, there is a linear relationship between the rotational movement of the rotary wheel 56 and the translational movement of both the right optical system (16R, 18R) and the left optical system (16L, 18L). Similarly, since the focussing mechanism or movement-conversion mechanism for the photographing lens system 67 is formed by the male and female screws, there is a linear relationship between the rotational movement of the rotary wheel 56 and the translational movement of the photographing lens system 67.

However, in reality, there is not necessarily a linear relationship between a focussing position of both the right optical system (16R, 18R) and the left optical system (16L, 18L) and a distance measured from the focussing position of both the right and left optical systems (16R; 18R, and 16L; 18L) to both the objective lens systems 14R and 14L. Similarly, there is not necessarily a linear relationship between a focussing position of the photographing lens system 67 and a distance measured from the focussing position of the photographing lens system 67 to the light receiving surface of the CCD image sensor 74.

Thus, before both the right and left optical systems (16R; 18R, and 16L; 18L) and the photographing lens system 67 can be precisely positioned at their respective focussing positions, each of the movement-conversion mechanisms should be formed by a cam groove (98, 102) and a cam follower (100, 104) as shown in FIG. 8, because it is possible to nonlinearly move both the right and left optical systems (16R; 18R, and 16L; 18L) and the photographing lens system 67 in relation to both the objective lens system 14R and 14L and the CCD image sensor 74. In short, by using the cam grooves 98 and 102 and the cam followers 100 and 104, it is possible to precisely position both the right and left optical systems (16R; 18R, and 16L; 18L) and the photographing lens at their respective focussing positions.

Of course, since both the right and left telescopic lens systems 12R and 12L and the photographing lens system 67 have a certain amount of focal depth, there is no trouble in forming the corresponding movement-conversion mechanism by the male and female screws. However, as an object to be focussed gets nearer to the binocular telescope with the digital camera, it is more difficult to linearly approximate a relationship between the focussing position of the optical system (16R; 18R; 16L; 18L or 67) and the corresponding distance. For example, when both the right and left telescopic lens systems 12R and 12L and the photographing lens system 67 are designed so that the nearest object, situated less than 1.0 meter ahead of the binocular telescope with the digital camera, can be focussed, it is impossible to linearly approximate a relationship between the focussing position of the optical system (16R; 18R; 16L; 18L or 67) and the corresponding distance. In this case, it is necessary to form the focussing mechanisms or movement-conversion mechanisms with the respective cam groove 98 and 102 and the respective cam follower 100 and 104, as shown in FIG. 8.

Although the above-mentioned embodiments are directed to a binocular telescope containing a digital camera, the concept of the present invention may be embodied in another optical viewer instrument containing a digital camera, such as a single telescope.

Also, in the above-mentioned embodiments, although the casing is formed by a main casing section and a movable casing section slidably engaged with each other for the interpupillary adjustment of the right and left telescopic lens systems, the concept of the present invention may be embodied in another type of binocular telescope containing a digital camera, for example, a binocular telescope in which both right and left telescopic lens systems are rotatable around an axis of a rotary focussing wheel for the interpupillary adjustment of the right and left telescopic lens systems.

Finally, it will be understood by those skilled in the art, that the foregoing descriptions are of preferred embodiments of the instrument, and that various changes and modifications may be made to the present invention without departing from the spirit and scope thereof.

The present disclosure relates to subject matters contained in Japanese Patent Applications No. 2001-301921 (filed on Sep. 28, 2001), No. 2001-301960 (filed on Sep. 28, 2001), and No. 2002-014051 (filed on Jan. 23, 2002), which are expressly incorporated herein, by reference, in their entirety.

What is claimed is:

1. An optical viewer instrument with a photographing function, comprising:
    a telescopic optical system that observes an object;
    a digital camera system including a solid-state image sensor and a photographing optical system associated with each other such that the object is formed as a photographic image on a light-receiving surface of said solid-state image sensor through said photographing optical system; and
    a manually-operable focussing mechanism associated with said telescopic optical system and said photographing optical system such that the object is brought into focus through said telescopic optical system, and such that the object is brought into focus through said photographing optical system,
    wherein the following conditions are fulfilled:

$$65 \ mm/rad^2 < y^2/[1000 \times PF(\omega/T)^2] < 95 \ mm/rad^2 \ and \ F < 6$$

wherein: "F" represents an f-number of the photographing optical system;
    "y" represents a maximum image height (mm) of the solid-state image sensor, which is defined as one-half of a diagonal line length of the light-receiving surface of the solid-state image sensor;
    "$\omega$" represents a half field angle (rad) of the telescopic optical system;
    "T" represents a field ratio of the half field angle "$\omega$" to a half field angle "$\theta$" (rad) of the photographing optical system (T=$\omega/\theta$); and
    "P" represents a pixel pitch of the solid-state image sensor.

2. An optical viewer instrument with a photographing function, comprising:
    a telescopic optical system including an optical objective system, an optical erecting system, and an optical ocular system to thereby observe an object, both said optical erecting and ocular systems being relatively movable with respect to said optical objective system along an optical axis of said telescopic optical system;
    a tubular shaft rotatably provided beside said telescopic optical system;
    a photographing optical system housed in said tubular shaft;
    a solid-state image sensor aligned with said photographing optical system so as to be spaced a given distance away from a rear end of said photographing optical system;
    a first focussing mechanism that converts a rotational movement of said tubular shaft into a relative translational movement between both said optical erecting and ocular systems and said optical objective system to thereby bring the object into focus through said telescopic optical system;
    a second focussing mechanism that converts the rotational movement of said tubular shaft into a translational movement of said photographing optical system with respect to said solid-state image sensor to thereby focus the object on the light-receiving surface of said solid-state image sensor; and
    a manually-operable system that causes the rotational movement of said tubular shaft such that said first and second focussing mechanisms are operationally connected to each other,
    wherein the following conditions are fulfilled:

$$65 \ mm/rad^2 < y^2/[1000 \times PF(\omega/T)^2] < 95 \ mm/rad^2 \ and \ F < 6$$

wherein: "F" represents an f-number of the photographing optical system;
    "y" represents a maximum image height (mm) of the solid-state image sensor, which is defined as one-half of a diagonal line length of the light-receiving surface of the solid-state image sensor;
    "$\omega$" represents a half field angle (rad) of the telescopic optical system;
    "T" represents a field ratio of the half field angle "$\omega$" to a half field angle "$\theta$" (rad) of the photographing optical system (T=$\omega/\theta$); and
    "P" represents a pixel pitch of the solid-state image sensor.

3. An optical viewer instrument with a photographing function as set forth in claim 2, wherein said second focussing mechanism is constituted such that a linear relationship is established between the rotational movement of said tubular shaft and the translational movement of said photographing optical system.

4. An optical viewer instrument with a photographing function as set forth in claim 3, wherein said first focussing mechanism is constituted such that a linear relationship is established between the rotational movement of said tubular shaft and the relative translational movement between both said optical erecting and ocular systems and said optical objective system.

5. An optical viewer instrument with a photographing function as set forth in claim 2, wherein said second focussing mechanism is constituted such that a nonlinear relationship is established between the rotational movement of said tubular shaft and the translational movement of said photographing optical system.

6. An optical viewer instrument with a photographing function as set forth in claim 5, wherein said first focussing mechanism is constituted such that a nonlinear relationship is established between the rotational movement of said tubular shaft and the relative translational movement between both said optical erecting and ocular systems and said optical objective system.

7. An optical viewer instrument with a photographing function as set forth in claim 2, wherein said telescopic optical system is defined as a first telescopic optical system, further comprising a second telescopic optical system including an optical objective system, an optical erecting system, and an optical ocular system to thereby observe an object, both said optical erecting and ocular systems being relatively movable with respect to said optical objective system along an optical axis of said second telescopic optical system, said tubular shaft being disposed between said first and second telescopic optical systems, said first focussing mechanism further converting the rotational movement of said tubular shaft into a relative translational movement between both said optical erecting and ocular systems, included in said second telescopic optical system, and said optical objective system, included in said second telescopic optical system, to thereby bring the object into focus through said second telescopic optical system.

8. An optical viewer instrument with a photographing function as set forth in claim 7, further comprising a casing that receives said first and second telescopic optical systems, said casing including two casing sections movably engaged with each other, said respective first and second telescopic optical systems being assembled in said casing sections such that a distance between the optical axes of said first and second telescopic optical systems is adjustable by relatively moving one of said casing sections with respect to the remaining casing section.

9. An optical viewer instrument with a photographing function as set forth in claim 8, wherein one of said casing sections is slidably engaged with the remaining casing section such that the optical axes of said first and second telescopic optical systems are movable in a common geometric plane by relatively sliding one of said casing sections with respect to the remaining casing section.

10. A binocular telescope with a photographing function, comprising:
a pair of telescopic optical systems, each of which includes an optical objective system, an optical erecting system, and an optical ocular system to thereby observe an object, both said optical erecting and ocular systems being relatively movable with respect to said optical objective system along an optical axis of the corresponding telescopic optical system;
a digital camera system including a solid-state image sensor and a photographing optical system associated with each other such that the object is formed as a photographic image on a light-receiving surface of said solid-state image sensor through said photographing optical system;
a tubular shaft rotatably provided between said telescopic optical systems; and
a manually-operable focussing mechanism associated with said pair of telescopic optical systems such that a rotational movement of said tubular shaft is converted into a relative translational movement between both said optical erecting and ocular systems, included in each telescopic optical system, and said optical objective system, included in each telescopic optical system, to thereby bring the object into focus through said pair of telescopic optical systems,
wherein said photographing optical system is housed in said tubular shaft, and said solid-state image sensor is aligned with said photographing optical system so as to be spaced a given distance away from a rear end of said photographing optical system; and
wherein the following conditions are fulfilled:

$$65\ mm/rad^2 < y^2/[1000 \times PF(\omega/T)^2] < 95\ mm/rad^2 \text{ and } F<6$$

wherein: "F" represents an f-number of the photographing optical system;
"y" represents a maximum image height (mm) of the solid-state image sensor, which is defined as one-half of a diagonal line length of the light-receiving surface of the solid-state image sensor;
"ω" represents a half field angle (rad) of each telescopic optical system;
"T" represents a field ratio of the half field angle "ω" to a half field angle "θ" (rad) of the photographing optical system (T=ω/θ); and
"P" represents a pixel pitch of the solid-state image sensor.

11. A binocular telescope with a photographing function as set forth in claim 10, wherein said manually-operable focussing mechanism is further associated with said photographing optical system such that the rotational movement of said tubular shaft is converted into a translational movement of said photographing optical system with respect to said solid-state image sensor, to thereby focus the object on the light-receiving surface of said solid-state image sensor, whereby the focusing of said pair of telescopic optical systems is operationally connected to the focusing of the photographing optical system.

12. A binocular telescope with a photographing function as set forth in claim 11, wherein said manually-operable focussing mechanism is constituted such that a linear relationship is established between the rotational movement of said tubular shaft and the translational movement of said photographing optical system.

13. A binocular telescope with a photographing function as set forth in claim 12, wherein said manually-operable focussing mechanism is further constituted such that a linear relationship is established between the rotational movement of said tubular shaft and the relative translational movement between both said optical erecting and ocular systems and said optical objective system.

14. A binocular telescope with a photographing function as set forth in claim 11, wherein said manually-operable focussing mechanism is constituted such that a nonlinear relationship is established between the rotational movement of said tubular shaft and the translational movement of said photographing optical system.

15. A binocular telescope with a photographing function as set forth in claim 14, wherein said manually-operable focussing mechanism is further constituted such that a nonlinear relationship is established between the rotational movement of said tubular shaft and the relative translational movement between both said optical erecting and ocular systems and said optical objective system.

16. A binocular telescope with a photographing function as set forth in claim 11, further comprising a casing that receives said telescopic optical systems, said casing including two casing sections movably engaged with each other, said respective telescopic optical systems being assembled in said casing sections such that a distance between the optical axes of said telescopic optical systems is adjustable by relatively moving one of said casing sections with respect to the remaining casing section.

17. A binocular telescope with a photographing function as set forth in claim 11, wherein one of said casing sections is slidably engaged with the remaining casing section such that the optical axes of said first and second telescopic optical systems are movable in a common geometric plane by relatively sliding one of said casing sections with respect to the remaining casing section.

* * * * *